United States Patent
Lacy et al.

(10) Patent No.: US 7,078,704 B2
(45) Date of Patent: Jul. 18, 2006

(54) CYLINDRICAL IONIZATION DETECTOR WITH A RESISTIVE CATHODE AND EXTERNAL READOUT

(75) Inventors: Jeffrey L. Lacy, Missouri City, TX (US); Athanasios Athanasiades, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 0 days.

(21) Appl. No.: 10/852,571

(22) Filed: May 24, 2004

(65) Prior Publication Data

US 2005/0012048 A1    Jan. 20, 2005

Related U.S. Application Data

(60) Provisional application No. 60/472,984, filed on May 23, 2003.

(51) Int. Cl.
*G01T 1/18* (2006.01)
*H01J 47/00* (2006.01)
*H01J 47/02* (2006.01)
*H01J 47/06* (2006.01)
*H01J 47/08* (2006.01)

(52) U.S. Cl. .................. 250/385.1; 250/375
(58) Field of Classification Search ......... 250/385.1, 250/374
See application file for complete search history.

(56) References Cited

U.S. PATENT DOCUMENTS

| 4,289,967 | A | * | 9/1981 | Hanson et al. | 250/385.1 |
| 5,742,061 | A | * | 4/1998 | Lemonnier et al. | 250/385.1 |
| 6,078,039 | A | * | 6/2000 | Lacy | 250/214 VT |
| 6,486,468 | B1 | * | 11/2002 | Lacy | 250/282 |
| 6,891,165 | B1 | * | 5/2005 | Buffet et al. | 250/374 |

OTHER PUBLICATIONS

Athanasiades, A., Lacy, J., and Liang, S. "Position Sensing in a Cylindrical Ionization Detector Through the Use of a Segmented Cathode". Nuclear Science Symposium Conference Record, vol. 2, (Nov. 2001), pp. 1151-1155.*

* cited by examiner

*Primary Examiner*—David Porta
*Assistant Examiner*—Frederick F. Rosenberger
(74) *Attorney, Agent, or Firm*—Gregory M. Hasley; Akin Gump Strauss Hauer & Feld LL (57) ABSTRACT

A new design for a cylindrical ionization detector, featuring a resistive cathode, and external pickup wires that sense both the azimuthal and radial coordinates of interaction vertices. Combined with measurement of the longitudinal coordinate (using resistive anode wire charge division or other technique), the proposed design can provide an accurate 3-dimensional imaging detector and offer improved spectroscopic response.

7 Claims, 8 Drawing Sheets

CYLINDRICAL IONIZATION DETECTOR WITH A RESISTIVE CATHODE AND EXTERNAL READOUT

CROSS-REFERENCE TO RELATED APPLICATIONS

This application claims the benefit under 35 U.S.C. § 119(e) of provisional patent application No. 60/472,984, filed May 23, 2003.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

This invention relates to a new design for a cylindrical ionization detector.

2. Description of the Related Art

In a cylindrical ionization detector, sensing of the position of Compton and photoelectric gamma interactions is of great value in imaging applications. Moreover, measurement of the radial coordinate can be used to correct for the spatial dependence of the amount of charge sensed by the electrodes, which otherwise degrades energy resolution. While position sensing is common in proportional detectors like multiwire counters [G. Charpak and F. Sauli. *Nucl. Instrum. Meth.*, 162:405, 1979; J. L. Lacy and R. S. Lindsey. High-resolution readout of multiwire proportional counters using the cathode-coupled delay-line technique. *Nucl. Instrum. Meth.*, 119:483–498, 1974], where low gas pressures allow high signal gains, appropriate methods for ionization chambers, where signals are of low amplitude, have not been fully explored. A couple of studies have proposed position sensing based on electron drift time measurements, with limited success [N. G. Goleminov, B. U. Rodionov, and V. Yu. Chepel. Position sensitive xenon gamma-quantum detector. *Instruments and Experimental Techniques*, 29(2):325–328, 1986; G. Tepper and J. Losee. A compressed xenon ionization chamber X-ray/gamma-ray detector incorporating both charge and scintillation collection. *Nuclear Instruments and Methods in Physics Research A*, 368:862–864, 1996]. On the other hand, the geometrical dependence of energy resolution in cylindrical ionization detectors can be addressed by the use of Frisch grids. However, they are sensitive to microphonic noise, structurally difficult to implement, and degrade spectroscopic resolution by adding substantial capacitive load to the charge sensitive amplifier, thereby producing increased noise levels.

BRIEF SUMMARY OF THE INVENTION

This invention relates to a new design for a cylindrical ionization detector, featuring a resistive cathode, and external pickup wires that sense both the azimuthal and radial coordinates of interaction vertices. Combined with measurement of the longitudinal coordinate (using resistive anode wire charge division or other technique), the proposed design can provide an accurate 3-dimensional imaging detector and offer improved spectroscopic response.

BRIEF DESCRIPTION OF THE DRAWINGS

FIG. 1B is a detail of the area indicated in FIG. 1A. FIG. 1C is a cross-sectional view in the plane indicated in FIG. 1A.

DETAILED DESCRIPTION OF THE INVENTION

Figure 1A:
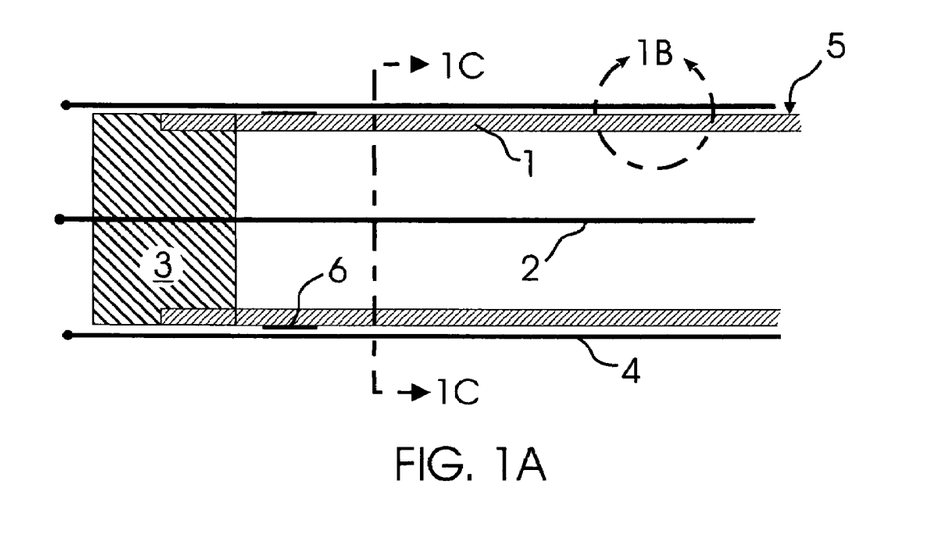
FIGS. 1A, 1B and 1C are schematic cross-sectional views of the proposed detector.
Figure 1B:
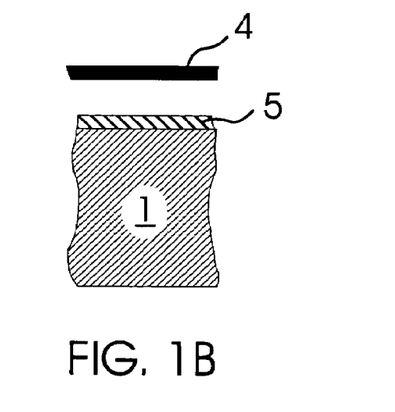
Figure 1C:
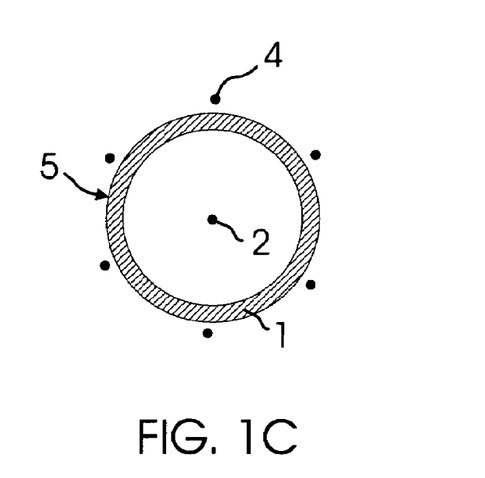
Figure 2:
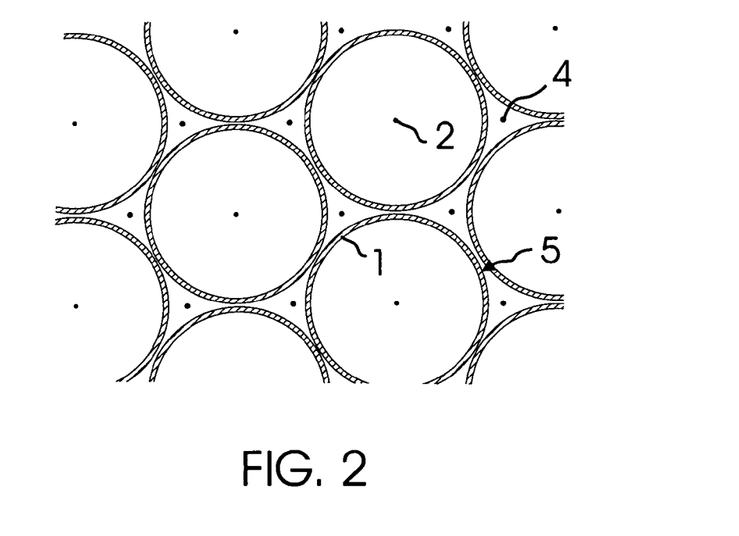
FIG. 2 is a schematic cross-sectional view of the proposed configuration for optimal detection efficiency and readout.

A schematic of the proposed detector and readout is shown in FIG. 1. It consists of a highly resistive tube 1 that contains gas at high pressure, a conducting wire 2 through its center that serves as the anode, insulating plugs 3 at both ends that support the anode, and six conducting wires 4 located outside the tube at 60-degree intervals. The outside surface of the tube is coated to achieve appropriate surface resistivity (as explained below). This coating serves as the cathode 5. An electrical field is generated inside the detector by application of potential through a circumferential electrode 6, electrically connected to cathode 5. Gamma radiation is stopped in high pressure gas contained within the tube. Signals induced in the anode and pickup wires are read out through charge sensitive amplifiers. The positioning of the external sensing wires allows readout of close-packed arrays of many such detectors, as shown in FIG. 2. In that configuration, each sense wire is shared among three detectors, reducing substantially the multiplicity of the readout electronics required.

Figure 3:
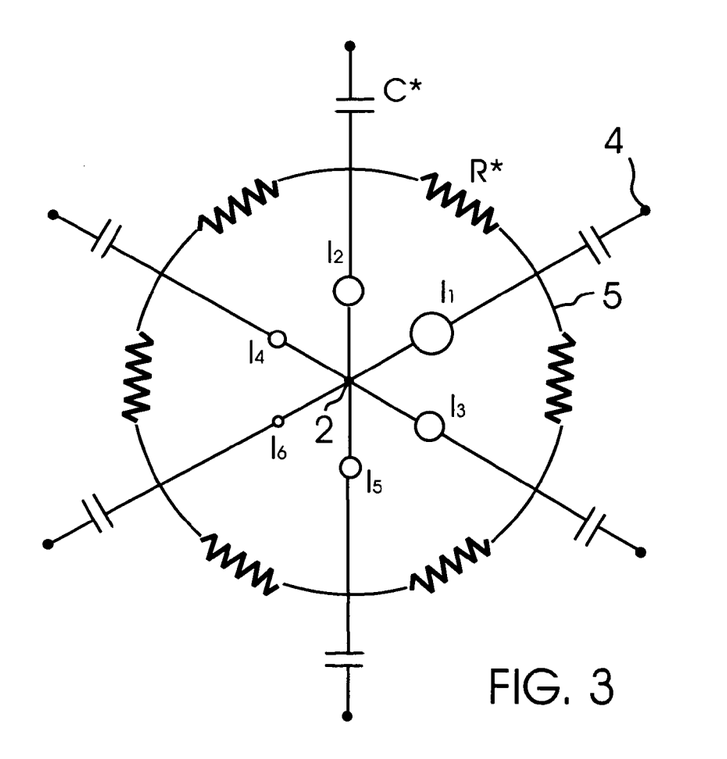
FIG. 3 is an equivalent electrical circuit for pulse propagation.

Pulse propagation. A lumped-parameter equivalent electrical circuit that illustrates the propagation of pulses generated inside the detector to the external sensing wires, is shown in FIG. 3. The cathode 5 is represented by a series of resistances R*, and is coupled to the pickup wires 4 by capacitance C*. The ionization current generated in the detector is represented by current sources $I_i$, for i=1, . . . ,6. The value of $I_i$ depends on the location of the interaction vertex and can be predicted with the weighting potential method, as discussed later. For the short duration of the pulse generation (few microseconds), current from sources $I_i$, charges up capacitances C*, causing charge flow to the pick up wires 4, which are then read-out by the amplifier. During this short time, no current flows through resistors R*, therefore pulse transmission from the detector to the pickup wire is not affected by the presence of the cathode 5.

Cathode transparency. Quantitatively, the time constant of the R*C* network (cathode shielding time constant [G. Battistoni, P. Campana, V. Chiarella, U. Denni, E. Iarocci, and G. Nicoletti. Resistive cathode transparency. *Nucl. Instrum. Meth.*, A202:459, 1982]) needs to be much longer than the pulse rise time in order to achieve this transparency. The value of C* is weakly dependent on the placement of the wires, thus the R*C* time constant is effectively controlled by the resistivity of the cathode $\rho_s$, since $$R^* = \rho_s(2\pi b)/(6w^*),$$

where w* is the width of the current path in the circumferential direction, and b the cathode radius. The optimal resistivity of the cathode is dictated by two competing requirements: transparency for external sensing requires a cathode shielding time constant that is orders of magnitude greater than the rise time of the generated pulse, as illustrated previously; at the same time, enough conductivity is needed in the cathode to avoid charge accumulation, as discussed next.

Positive charges. In addition to the charge induced in the pickup wires, a charge Q equal to the ionization charge (from positive ions) arrives at the inside surface of the gas tube. If not adequately drained it will build a potential opposite to that applied externally, and thus reduce the intensity of the electric field. From the inside surface of the tube, charge Q will cross the wall to the resistive paint on the outside, and travel through that paint to the electrode where the high voltage is applied. The associated current is equal to $I_p = Q \cdot v$, where v is the mean counting rate of the detector. As this current flows along the tube length, the potential across it drops by $V = I_p R$ volts, where R is the sum of all resistances encountered. The resistance along the resistive layer equals, $$R_1 = \rho_s d/w,$$

where d is the length of the tube traveled, and w is the width of the current path. The resistance across the wall equals $$R_2 = \rho_w T/A,$$

where $\rho_w$ is the volume resistivity of the wall material, T is the wall thickness and A is the surface area through which the current crosses. For gamma ray imaging of energies less than 511 keV, the anticipated voltage drop is insignificant, since the ionization current $I_p$ is small and spread over a large surface area along the length of the detector.

Figure 4:
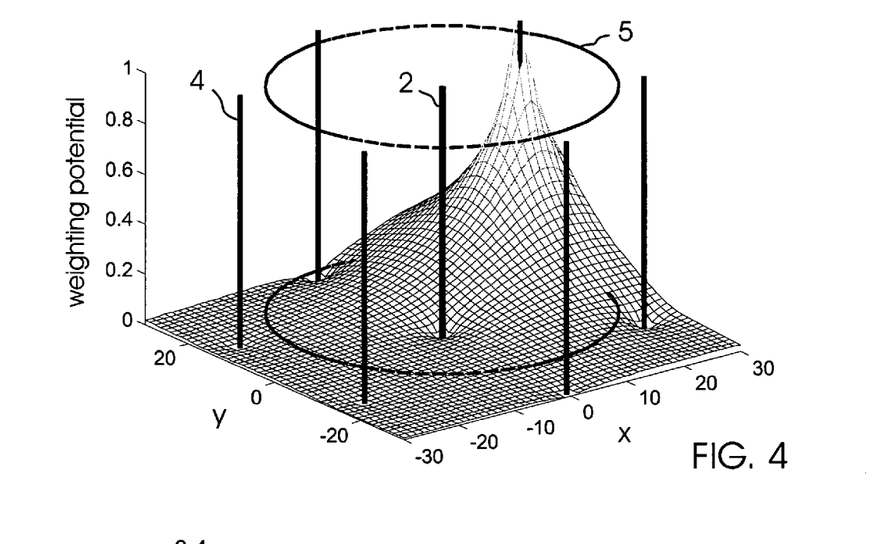
FIG. 4 is a surface plot of the weighting potential $\Phi_{w,i}$ for one wire. The six sensing wires and anode are rendered for reference. The cathode, indicated by the dashed circles, is transparent to the induced signals and does not affect the weighting potential.
Figure 5:
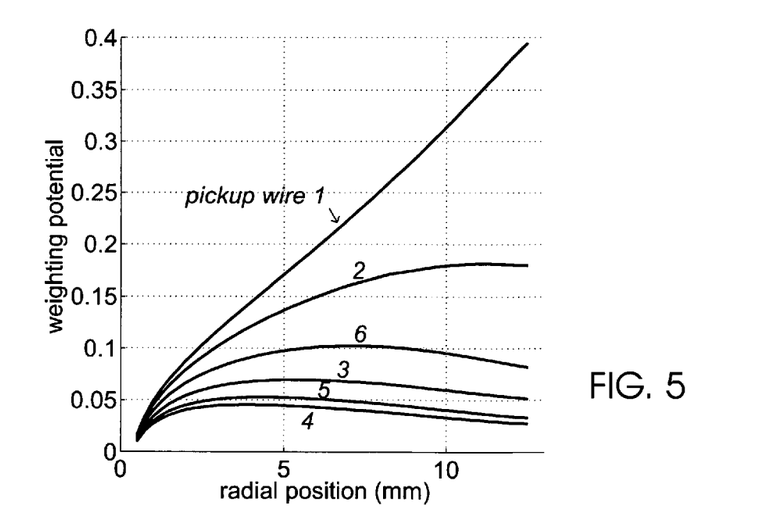
FIG. 5 is a weighting potential for the six pickup wires, for an event interaction at radius r and angle $\theta=45°$. Wires are located at 30, 90, 150, 210, 270 and 330 degrees.

Weighting potential method. The charge $Q_i$, induced in the ith electrode, can be predicted by the method of the weighting potential $\Phi_w$ (see [S. Ramo. Currents induced by electron motion. *Proc. IRE*, 27:584–585, 1939, W. Shockley. Currents to conductors induced by a moving point charge. *J. Appl. Phys.*, 9:635–636, 1938] and appendix in [G. F. Knoll. *Radiation detection and measurement*. John Wiley & Sons, Inc., 3rd edition, 2000]). According to this method, $Q_i$ equals the amount of charge freed inside the detector, scaled by the change in $\Phi_w$, as electrons traverse a radial path from the interaction point to the anode, or, $$Q_i = n_0 e \Delta \Phi_{wi},$$

where $n_0 e$ is the electronic charge of n liberated electrons. The weighting potential for one electrode, obtained with the finite element method, is shown in FIG. 4. FIG. 5 shows the weighting potential for all electrodes, along a single radial path at an angle of 45 degrees from the horizontal. This method was used to predict the response of the detector and readout, as discussed later.

Figure 6:
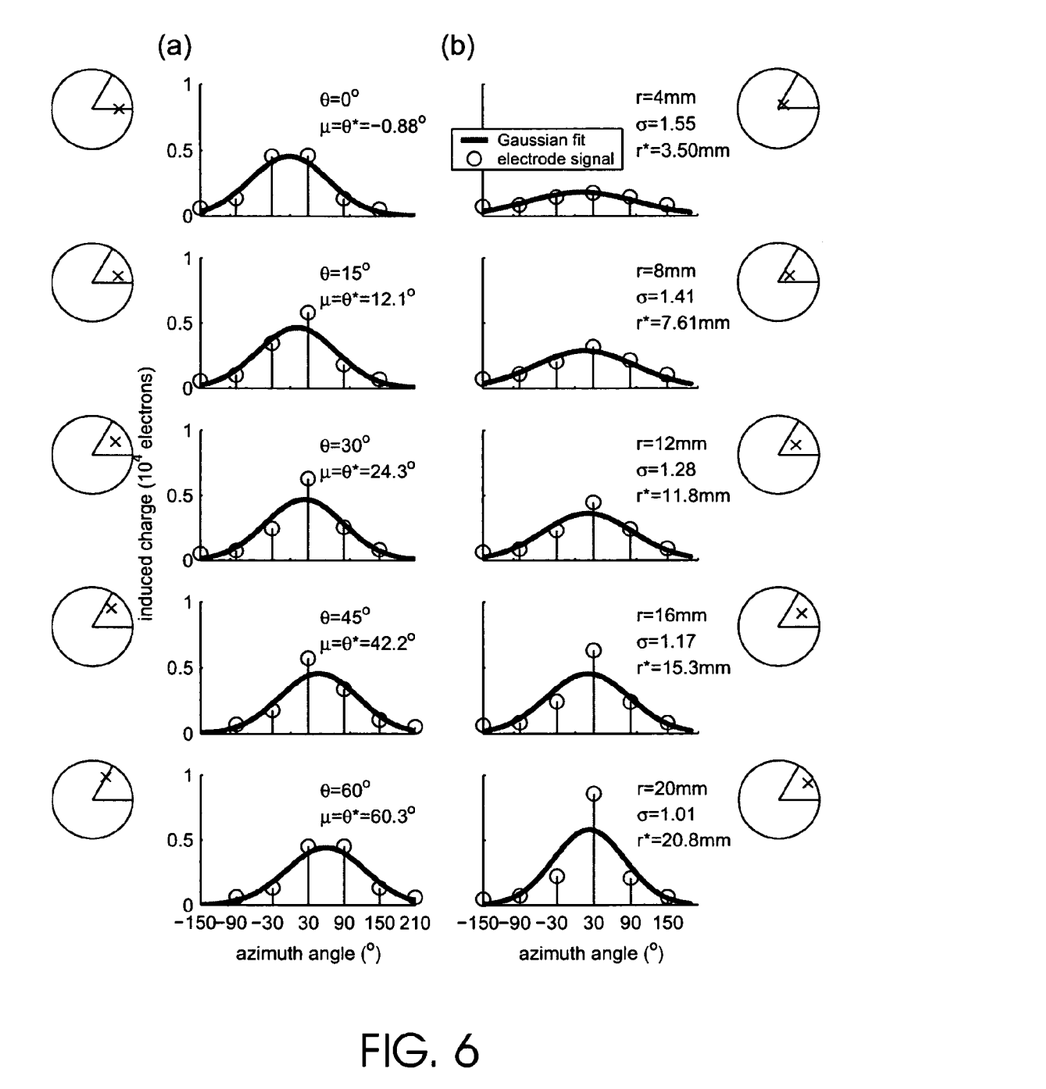
FIG. 6 is electrode signals (induced charge $Q_i$) for 511 keV radiation interactions, and associated Gaussian fits for interacting events located at (a) varying angles $\theta$ (radius r=8 mm), and (b) varying radii r (angle $\theta=30°$), as indicated by the x in each panel. Size parameters are b=12 mm and b/a=32. For simplicity, all events occur in a single 60° sector.

Position encoding. Any interacting event, with polar coordinates (θ,r), induces a signal in all sense wires near it. The strongest signals are induced in the six wires surrounding the tube in which the event took place. Our encoding scheme predicts θ and r by fitting a Gaussian curve to the six signals induced in those wires, as shown in FIG. 6. The Gaussian mean μ provides a measure of the azimuthal angle of the event, while the width of the Caussian correlates with the radial coordinate. Specifically, $$\theta^* \equiv \mu \text{ and } r^* \equiv \sum_{n=0}^{6} k_n \sigma^n$$

where k is a vector of coefficients, k=[30.9 −295 990 −1475 996 −206 0.9], σ is the standard deviation of the Gaussian fit, and the stars denote estimates of the respective variables. The values of k were obtained by Monte Carlo simulation of random interaction and using the weighting potential method to predict the detector response. Examples of estimated radial and azimuthal positions are included in FIG. 6 and show good agreement with the true values.

The prototype detector was fabricated according to the proposed design, using a quartz fiber composite tube (25.4 mm in diameter, 0.5 mm wall thickness, $10^{15}$ Ω·cm volume resistivity), and a conductive paint with a surface resistivity of $10^{12}$ Ω/square. External wires were supported by plastic rings, mounted at each end of the detector. The radius of all wires, including the anode, was 0.356 mm. The active length of the detector was 133 mm. The operating voltage was 2300 V (for constant electron drift speed in xenon) and it was applied to a narrow strip of conductive tape wrapped around one end of the tube. Signals induced in the anode and pickup wires were read out through charge sensitive amplifiers.

For the geometry and materials of the prototype detector, the values of C* and R* were estimated to be $2.7 \times 10^{-12}$ F (analytically) and $104 \times 10^9$ Ω, respectively (assuming that w* is the whole length of the tube, a very conservative estimate). The cathode shielding time constant R*C* was 281 ms, five orders of magnitude larger than the pulse rise time. The voltage drop due to charge accumulation was estimated to be in the tens of volts. In an array of such detectors, the capacitance between one wire and all other wires around it (including anode wires) would be 0.15 pF/cm.

The prototype detector and its readout was tested by stopping alpha particles in 10 atm xenon gas. The limited range of alphas (≈2 mm) provided localized ionization, ideal for determining the position sensing resolution of the proposed design (this detector is however intended for stopping gamma radiation in xenon at pressures of 55 atm or higher;

the operation of such a detector was well simulated, since the saturated electron drift velocity in xenon is independent of pressure).

Figure 7:
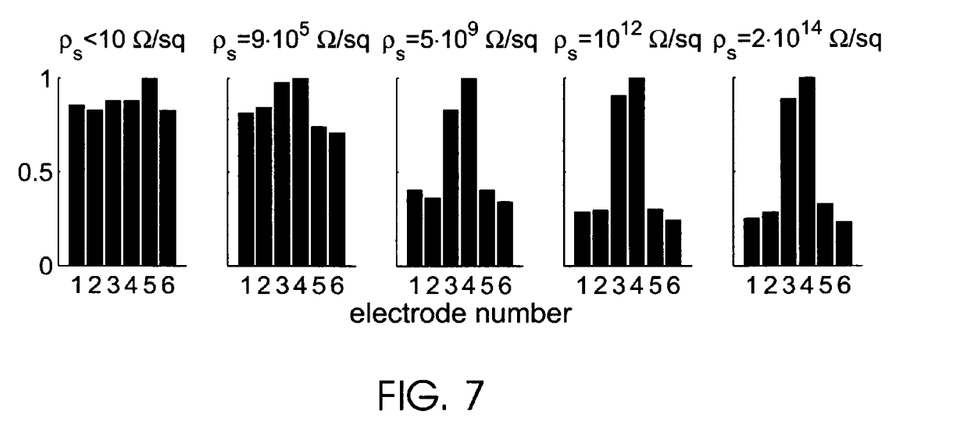
FIG. 7 is an average signal amplitude (normalized) measured in each of the six sensing wires of the prototype detector, at different cathode resistivities (see text for description of resistive films used).

Initially the effect of cathode resistivity on electrical transparency was investigated by wrapping different films around the prototype detector, and reading out signals from the six wires. The films used were a patterned-aluminum Kapton film, two carbon-loaded Kapton films of different resistivity, and a perfectly conductive aluminized film. Average signals read from each of the sensing wires are shown in FIG. 7. The conductive film (leftmost panel) acted as a shield around the detector, and no information about the location of radiation interactions was conveyed to the pickup wires (the distribution is nearly flat, as shown in the figure). A small variation in the signals, with higher amplitudes appearing in the wires nearest the source, was obtained when a thin film of antistatic Kapton ($9 \times 10^5$ Ω/square) was wrapped around the cathode (second panel from left). A similar film of significantly higher resistivity ($5 \times 10^9$ Ω/square) increased the transparency substantially and resulted in a well defined peak in the distribution of signals. The patterned Kapton film (resistivity of $10^{12}$ Ω/square) (fourth panel) renders the cathode as transparent as the detector wall itself ($2 \times 10^{14}$ Ω/square)(fifth panel).

Figure 8:
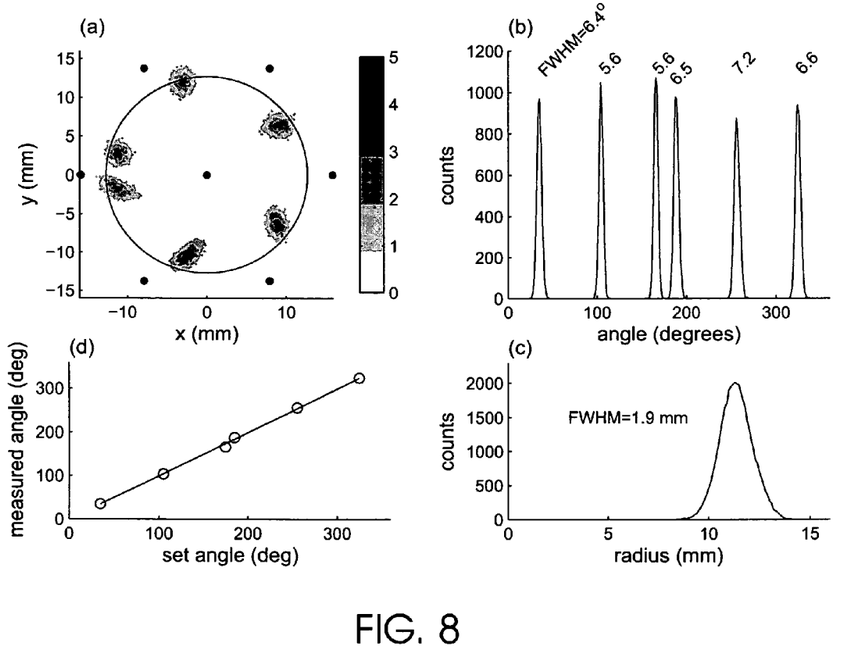
FIGS. 8 and 9 are position measurements of alpha particle interactions in xenon, based on the six wire readout of the prototype detector. (a) Readout for six clusters of events, at angles of 35, 105, 175, 185, 255, and 325 degrees, as measured from the positive x-axis. Each clusters contains approx. 7000 events. (b) Distribution of the azimuthal coordinate for each of the clusters in (a). (c) Distribution of the radial coordinate of the sum of all events in (a). (d) Correlation between the set and measured angles.
Figure 9:
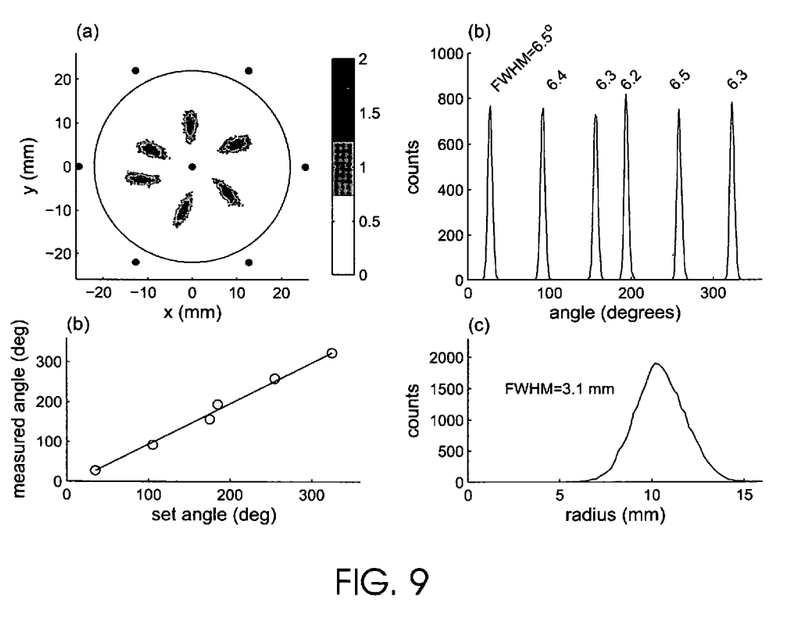

FIG. 8($a$) plots the coordinates of thousands of alpha particle interactions in xenon gas, as determined by the six-channel readout and the position encoding described above. Events at six different angles (radius of 15.7 mm) were recorded, by rotating the pickup wire assembly in 10-degree increments (an angle of 60° was added to each measurement for easier visualization). The FWHM of the distribution of angles varied from 5.6° to 7.2°, as shown in FIG. 8($b$), which translates to a tangential spatial resolution of 1.3 mm, or better. The FWHM of the distribution of radii was under 2 mm, as shown in FIG. 8($c$). The measurement was repeated with the pickup wires at a larger radius of 25.4 mm, as shown in FIG. 9. This placement is equivalent to a readout for which events occur midway along the radial direction in a tube having a diameter of 50.8 mm. The distribution of radii was broader (3.1 mm FWHM) due to amplifier noise.

Figure 10:
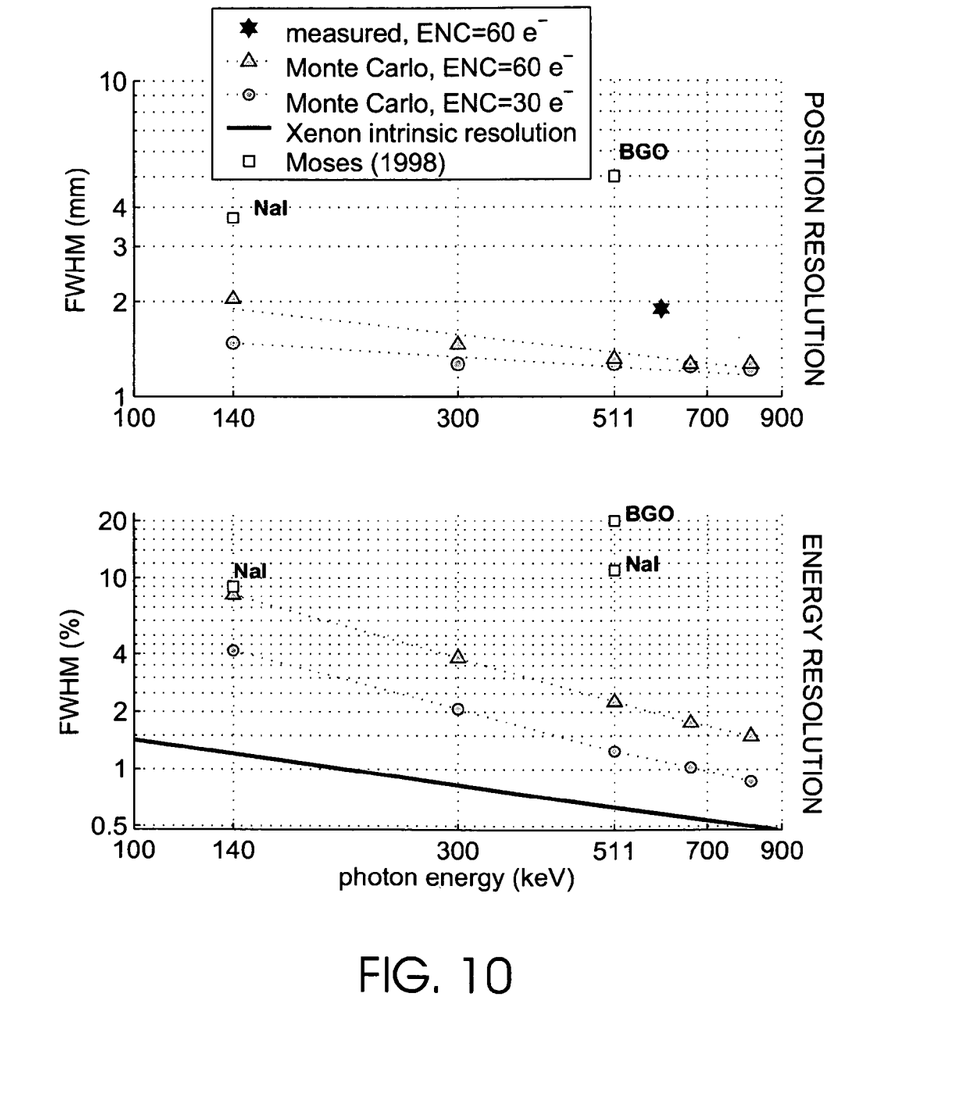
FIG. 10 is the position (top) and energy (bottom) resolutions of the new detector, as predicted in Monte Carlo simulations, for different photon energies.

The position and energy resolutions of the proposed design were, in addition, estimated in Monte Carlo simulations for different gamma energies, and are shown in FIG. 10. Assuming a noise level of 60 electrons, position resolution ranges from 2 mm at 140 keV to 1.3 mm at 511 keV. Energy resolution at those energies is 8.2% and 2.3%, respectively. The position resolution of 1.9 mm, reported in FIG. 8($c$), corresponds to the 600 keV energy mark in FIG. 10 (normalizing for an alpha energy of 5 MeV and actual noise level of 500 electrons during measurement). That resolution, however, was limited by the range of alpha particles in xenon. On the other hand, the simulations of FIG. 10 neglect the range of photoelectrons in xenon, which may be significant at high energies.

Although the invention has been described with reference to its preferred embodiments, those of skill in the art may from this description appreciate changes and modifications which can be made therein which do not depart from the scope and spirit of the invention as described and claimed hereafter.

The invention claimed is:

1. A cylindrical ionization detector, comprising:
   an electrically resistive tube filled with a gas,
   a conductive wire centered within said tube,
   an electrically conductive coating of high resistivity on the exterior surface of said tube, and
   conducting wires located near the exterior and along the length of said tube at each 60° interval along the circumference of said tube.

2. A cylindrical ionization detector, comprising:
   a closely packed array of electrically resistive tubes filled with a gas,
   a conductive wire centered within each of said tubes,
   an electrically conductive coating of high resistivity on the exterior surface of each of said tubes, and
   conducting wires located near the exterior and along the length of each of said tubes at each 60° interval along the circumference of each tube.

3. The cylindrical ionization detector of claim 2, wherein a potential voltage is applied between the conductive wire centered within each tube as an anode and the electrically conductive coating on the exterior surface of each tube as a cathode.

4. The cylindrical ionization detector of claim 3, wherein the conductive wire centered within each tube and the conducting wires located near the exterior and along the length of each tube at each 60° interval of the circumference of said tube are electrically connected to charge sensitive amplifiers.

5. The cylindrical ionization detector of claim 4, wherein the electrically conductive coating on the exterior surface of said tube has a surface resistivity of at least about $10^{12}$ Ω/square, as required for cathode transparency but not higher than $10^{13}$ Ω/square, as required for charge dissipation.

6. The cylindrical ionization detector of claim 5, wherein the resistive tube has a volume resistivity of at least about $10^{12}$ Ωcm, as required for cathode transparency, but not higher than $10^{13}$ Ωcm, as required for charge dissipation.

7. The cylindrical ionization detector of claim 5, wherein the gas is xenon.

* * * * *